US009730089B1

(12) United States Patent
Wang et al.

(10) Patent No.: US 9,730,089 B1
(45) Date of Patent: Aug. 8, 2017

(54) REMOTE CONTROLLED WIFI TRANSCEIVER FOR WIRELESS HOME NETWORKS

(71) Applicant: Quantenna Communications, Inc., Fremont, CA (US)

(72) Inventors: Huizhao Wang, San Jose, CA (US); Hossein Dehghan, Diablo, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 15/390,445

(22) Filed: Dec. 23, 2016

(51) Int. Cl.
*H04W 24/02* (2009.01)
*H04W 72/02* (2009.01)
*H04W 24/08* (2009.01)
*H04Q 9/00* (2006.01)
*H04W 84/12* (2009.01)

(52) U.S. Cl.
CPC .............. *H04W 24/02* (2013.01); *H04Q 9/00* (2013.01); *H04W 24/08* (2013.01); *H04W 72/02* (2013.01); *H04Q 2213/13178* (2013.01); *H04W 84/12* (2013.01)

(58) Field of Classification Search
CPC ..... H04W 24/02; H04W 72/02; H04W 24/08; H04W 84/12; H04Q 9/00; H04Q 2213/13178
See application file for complete search history.

(56) References Cited

U.S. PATENT DOCUMENTS

| | | | | |
|---|---|---|---|---|
| 6,700,886 | B2 * | 3/2004 | Mullaney | H04J 3/0685 370/365 |
| 7,675,870 | B2 * | 3/2010 | Chun | H04J 3/1617 370/255 |
| 7,680,039 | B2 * | 3/2010 | Ho | H04L 47/10 370/230 |
| 8,223,768 | B2 * | 7/2012 | Handelman | H04L 47/10 370/391 |
| 9,306,874 | B2 * | 4/2016 | Tatsumi | H04L 45/245 |
| 9,319,149 | B2 * | 4/2016 | Luna | H04B 11/00 |
| 9,425,852 | B2 * | 8/2016 | Lam | H03H 2/005 |
| 2006/0146808 | A1 * | 7/2006 | Campini | H04L 12/24 370/360 |
| 2007/0053294 | A1 * | 3/2007 | Ho | H04L 47/10 370/235 |
| 2012/0224101 | A1 * | 9/2012 | Pouw | G05B 19/0426 348/554 |

* cited by examiner

*Primary Examiner* — Mounir Moutaouakil
(74) *Attorney, Agent, or Firm* — IP Creators; Charles C Cary (57) ABSTRACT

A wireless transceiver apparatus including: a plurality of components coupled to one another to form transmit and receive paths for processing wireless communications on the at least one selected wireless communication channel; local control circuits and a remote and local (R/L) switch fabric. The local control circuits each control a distinct portion of the wireless transceiver's wireless operations via connections to a related subset of the plurality of components. The R/L switch fabric configured to switchably connect each of the subsets of the plurality of components to at least one of, a related one of the local control circuits and a remote server providing remote control of a related portion of the wireless transceivers wireless operations, to enable a configurable mix of local and remote control sources among the distinct portions of the wireless transceiver's wireless operations.

32 Claims, 4 Drawing Sheets

FIG. 4   Method for Operating a WiFi Transceiver with RC

REMOTE CONTROLLED WIFI TRANSCEIVER FOR WIRELESS HOME NETWORKS

BACKGROUND OF THE INVENTION

1. Field of Invention

The field of the present invention relates in general to wireless local area networks including wireless access points (WAP) and wireless stations and sounding methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network. e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.1 ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

Increasingly dense deployments of WAP's and stations make new demands on the wireless local area network (WLAN). What is needed are improved methods for wireless communication between the WAP and its associated stations on the WLAN.

SUMMARY OF THE INVENTION

The present invention provides a method and apparatus for a wireless access point (WAP), a wireless station, or a WiFi system on a chip, to enhance wireless operations including communications and capabilities via a remote control feature which allows a configurable mix of local and remote control sources.

In an embodiment of the invention a wireless transceiver apparatus configured to support wireless communications with associated transceiver nodes on at least one selected wireless communication channel on a wireless local area network (WLAN) is disclosed. The wireless transceiver apparatus includes: a plurality of components coupled to one another to form transmit and receive paths for processing wireless communications on the at least one selected wireless communication channel; local control circuits and a remote and local (R/L) switch fabric. The local control circuits each control a distinct portion of the wireless transceiver's wireless operations via connections to a related subset of the plurality of components. The R/L switch fabric configured to switchably connect each of the subsets of the plurality of components to at least one of, a related one of the local control circuits and a remote server providing remote control of a related portion of the wireless transceiver's wireless operations, to enable a configurable mix of local and remote control sources among the distinct portions of the wireless transceiver's wireless operations.

The invention may be implemented in hardware, firmware, circuits or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for enhancing the wireless operations of various types of wireless transceivers including: a wireless access point (WAP), a wireless station, and a WiFi system on a chip. The enhancements are enabled via a remote/local controller integral with the wireless transceiver, which exposes the components which make up the transmit and receive path of the transceiver to a configurable mix of local and remote control sources. The enhancement of wireless operations includes: enhancement of communications on the wireless local area network (WLAN) of which the transceiver is a part, and enhancements of the capabilities of the wireless transceiver itself. An example of communications enhancements is the use of aggregate data from neighboring WLAN's by a remote WLAN optimization service to optimize the throughput of neighboring WLANs. An example of enhancement of capabilities of the wireless transceiver is the use of link operational parameters such as channel matrices or beamforming matrices to extract spatial characteristics of the subscriber's home or condo including: structure, number of occupants and their location and movement, and the physical location of each WAP and station in the structure. These capabilities allow the WAP to not merely serve as a conduit of upstream and downstream subscriber data, but also as an independent source of data, e.g. spatial information about the structure, occupants and behavioral characteristics within and around the subscriber's home.

Figure 1:
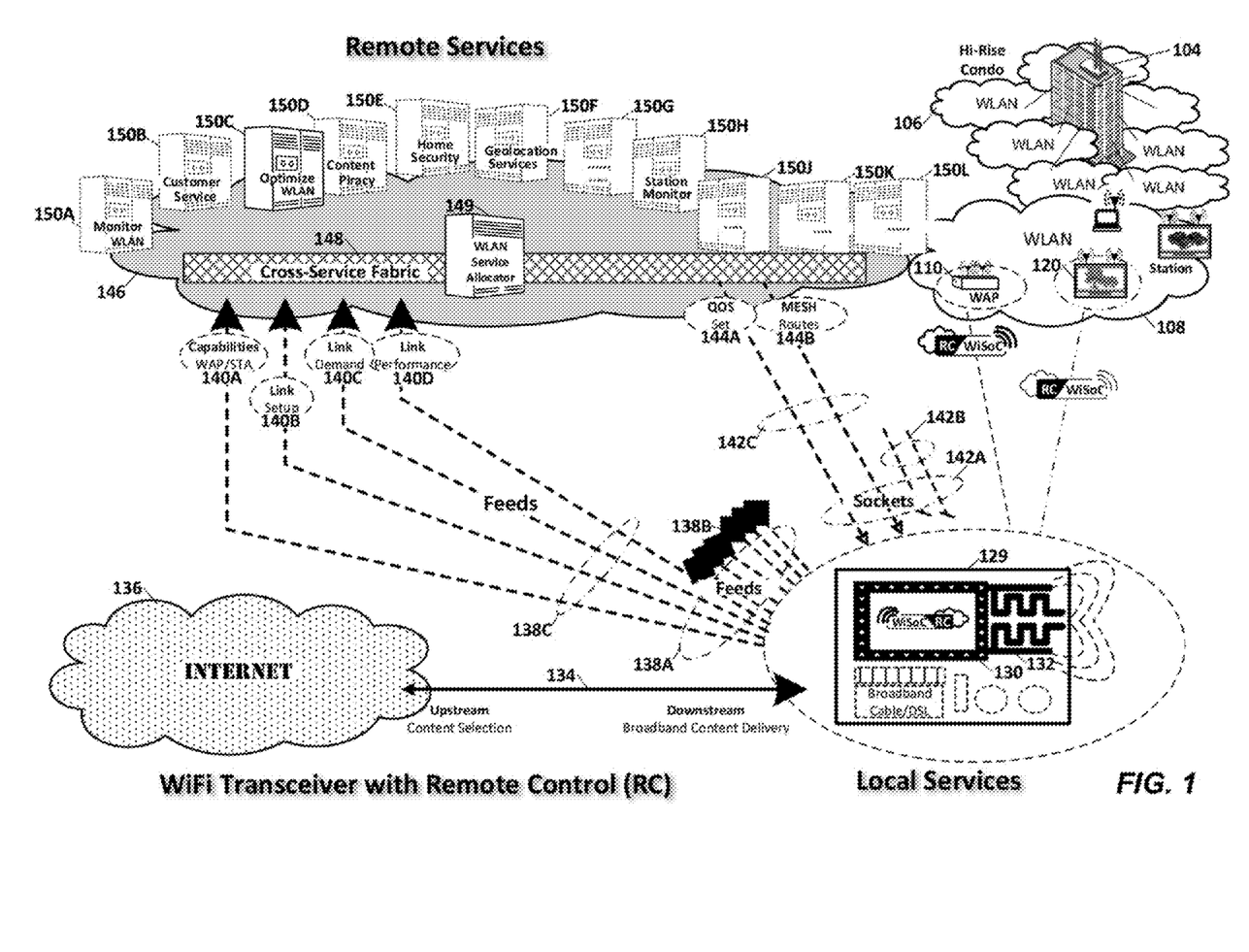
FIG. 1 is a system view of a wireless transceiver with a remote control capability coupled to a "Cloud" of remote services to enhance the wireless operations of the transceiver.

FIG. 1 is a system view of a wireless transceiver with a remote control (RC) capability coupled to a "Cloud" of remote services to enhance the wireless operations of the transceiver. A wireless transceiver 129 is shown as a WiFi system on a chip (WiSoC) with remote control (RC) capability, a.k.a WiSoC-RC. The WiSoC-RC 130 is shown with a pair of antenna 132 instantiated as copper traces on a printed circuit board. The WiSoC-RC 130 may be instantiated on one or more very large scale integrated circuit (VLSI) chips. The wireless transceiver 130 may operate as a WAP. The wireless transceiver 130 may also operate as a station. The wireless transceiver may also operate as a WiFi mesh node, a WiFi repeater/bridge. In the upper right corner of the figure a high-rise condo 104 with multiple residential wireless local area networks (WLAN)s; e.g. WLANs 106, 108; is shown. The wireless RC transceiver is shown as a part of one or more of those WLANs, as either or both a WAP and station. WLAN 108 including WAP 110 and station 120 is shown.

As a WAP, the wireless RC transceiver provides the various WLAN stations, and corresponding subscriber/user/client with broadband 134 access to the Internet 136. Each WLAN's broadband subscriber traffic is typically asymmetrical with the bulk of the traffic in the downstream direction from the Internet to the client in the form of streaming video or music for example. The modest amount of upstream traffic is typically limited to content selection.

The wireless RC transceiver also has a broadband connection to a remote server which can provide remote services which remotely control related portions of the wireless transceiver's wireless operations. In the embodiment of the invention shown in FIG. 1, the remote server is shown as WLAN service allocator 149 coupled via a cross-service fabric 148 to a plurality of remote services 150A-L. Remote services include: a WLAN monitoring service 150A; a WLAN customer/subscriber service 150B; a WLAN optimization service 150C; a content piracy detection service 150D; a subscriber home security service 150E, geolocation services 150F, and a station monitoring service 150H. The WLAN service allocator, cross-service fabric, and services collectively comprise a "Remote Services Cloud" 146.

After a capabilities exchange between the wireless transceiver 129 and the WLAN service allocator 149 the wireless transceiver is configured for a mix of local and remote control sources among the distinct portions of the wireless transceiver's wireless operations. The mix itself, may be determined by the wireless transceiver itself, or by the WLAN service allocator 149. The mix determination may be based on numerous criteria including: transceiver capabilities, subscriber need, and WLAN density for example. Among the many available information feeds 138A that the transceiver can provide, only those feeds 138C that are required to support the selected remote control sources is sent to the cloud, and specifically to the corresponding one of the service(s) 150A-L which are consuming each of the feeds. In the example shown the only one of the remote services 150C that is selected for remotely controlling a related portion of the wireless transceiver's operation is the WLAN optimization service 150C. That service consumes the transceiver's capabilities feed 140A, and link setup, demand, and performance feeds 140B-D. The remaining feeds 138B are consumed by local control sources within the transceiver 129 itself.

Among the many available control sockets 142A that the transceiver will accept, only those sockets 142C that are required for the selected remote control source(s) to control the corresponding portion of the transceivers operations is accepted from the cloud, and specifically from the corresponding one of the service(s) 150A-L which are providing the remote control. In the example shown the only one of the remote services 150C that is selected for remotely controlling the transceiver is the WLAN optimization service 150C. That service as discussed above, consumes the transceiver's capabilities feed 140A, link setup, demand, and performance feeds 140B-D and outputs quality of service (QOS) socket request/commands 144A, and mesh routing socket request/commands 144B. The transceivers remaining sockets 142B are output by local control sources within the transceiver 129 itself.

The remote control support provided by the WiSoc-RC 130 allows a host of ancillary cloud services to operate as remote control sources for the chip, and to define new capabilities for the chip simply by piggybacking on existing transceiver operations. A content Piracy service 150D which provides a Telco operator with notice that a subscriber who purchased two set top boxes for home use, has given one to a neighbor can be enabled by remotely controlling that portion of the WISoc-RC wireless operations related to link optimization. A home security service 150E which monitors a subscriber's home for intruders, or for an incapacitated elderly member of the house can be enabled by remotely controlling that portion of the WiSoc-RC wireless operations related to link optimization. A geolocation service 150F which determines the relative or absolute positions of each WAP and stations in each of the WLANs in the condo 104 can be enabled by remotely controlling that portion of the WiSoc-RC wireless operations related to link optimization. The remote control source can configure the corresponding portion of the WiSoC-RC wireless operations to provide exclusively related feeds, without opening any sockets, or to provide a combination of related feeds and related sockets.

Figures 2A, 2B:
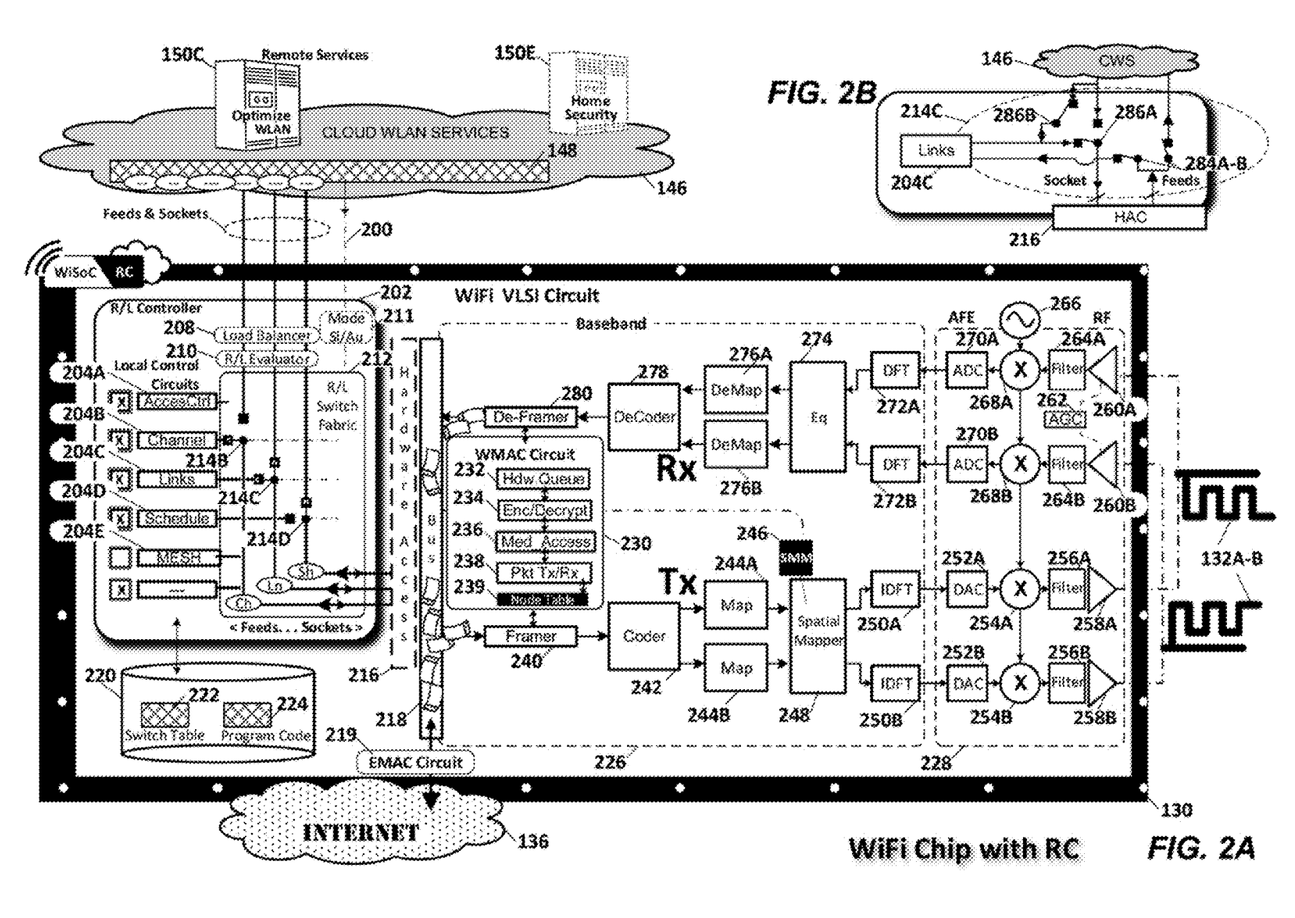
FIGS. 2A-B are hardware block diagrams of embodiments of respectively the wireless transceiver and an element of a remote/local fabric switch which is part of the wireless transceiver.

FIGS. 2A-B are hardware block diagrams of embodiments of respectively the wireless transceiver and an element of a remote/local fabric switch which is part of the wireless transceiver. The wireless transceiver may have one or more antenna. The WiSoC-RC 130 is shown as a wireless access point (WAP) with a MIMO pair of antenna 132A-B for supporting a wireless local area network (WLAN) which provides associated stations, access to the Internet 136. The WiSoC-RC is also communicatively coupled, via the shared broadband connection, to the remote services cloud 146 discussed above in connection with FIG. 1. The remote services cloud allows the chip to enhance its wireless operations.

The enhancements provided to the WiSoC-RC by the remote services are enabled via a remote/local controller 202 integral with the transceiver, which exposes the plurality of components 230-280 which make up baseband, analog front end (AFE) and radio frequency (RF) stages of the transmit and receive path of the transceiver; to a configurable mix of local control sources 204A-E and remote control sources 150A-K.

The wireless transceiver in this embodiment of the invention is identified as an 2×2 multiple-input multiple-output (MIMO) WAP supporting as many as 2 discrete communication streams over two antennas 132A-B. The WAP couples to the Internet 136 via an integral Ethernet medium access control (EMAC) interface 219 over a cable, fiber, or digital subscriber line (DSL) backbone connection. A packet bus 218 couples the EMAC to the MIMO WiFi baseband 226, and AFE-RF stages 228.

In the baseband portion 226 wireless communications transmitted to or received from each user/station are processed. The baseband portion is dynamically configurable to support SU-MIMO or MU-MIMO transmission to MU groups of two or more users/stations. The AFE and RF portion 228 handle the upconversion on each of transmit paths and wireless transmission initiated in the baseband. The RF portion also handles the downconversion of the signals received on the receive paths and passes them for further processing to the baseband.

Transmission:

The transmit path/chain includes the following discrete and shared components. The WiFi medium access control (WMAC) component 230 includes: hardware queues 232 for each downlink and uplink communication stream; encryption and decryption circuits 234 for encrypting and decrypting the downlink and uplink communication streams; medium access circuit 236 for making the clear channel assessment (CCA), and making exponential random backoff and re-transmission decisions; and a packet processor circuit 238 for packet processing of the communication streams. The WMAC component has read access to a node table 239 which is managed and maintained by the related one of the local control circuits. The node table lists each node/station on the WLAN, the station's capabilities, the corresponding encryption key, and the priority associated with its communication traffic.

Each sounding or data packet for wireless transmission on the transmit path components to one or more stations is framed in the framer 240. Next each stream is encoded and scrambled in the encoder and scrambler 242 followed by interleaving and mapping in a corresponding one of the interleaver mappers 244A-B. Next all transmissions are spatially mapped with a spatial mapping matrix (SMM) 246 in the spatial mapper 248. The spatially mapped streams from the spatial mapper are input to inverse discrete Fourier Transform (IDFT) components 250A-B for conversion from the frequency to the time domain and subsequent transmission in the AFT and RF stage.

Each IDFT is coupled to a corresponding one of the transmit path/chain components in the AFT RF stage 228 for wireless transmission on an associated one of MIMO antenna 132A-B. Specifically each IDFT couples to an associated one of the digital-to-analog converters (DAC) 252A-B for converting the digital transmission to analog, upconverters 254A-B, coupled to a common voltage controlled oscillator (VCO) 266 for upconverting the transmission to the appropriate center frequency of the selected channel(s), filters 256A-B e.g. bandpass filters for controlling the bandwidth of the transmission, and power amplifiers 258A-B for setting the transmit power level of the transmission on the MIMO antenna 132A-B.

Reception:

The receive path/chain includes the following discrete and shared components. Received communications on the WAP's array of MIMO antenna 132A-B are subject to RF processing including downconversion in the AFE-RF stage 228. There are two receive paths each including the following discrete and shared components: low noise amplifiers (LNA) 260A-B for amplifying the received signal under control of an analog gain control (AGC) for setting the amount by which the received signal is amplified, filters 264A-B for bandpass filtering the received signals, downconverters 268A-B coupled to the VCO 266 for downconverting the received signals, analog-to-digital converters (ADC) 270A-B for digitizing the downconverted signals. The digital output from each ADC is passed to a corresponding one of the discrete Fourier transform (DFT) components 272A-B in the baseband portion 226 of the WiFi stage for conversion from the time to the frequency domain.

Receive processing in the baseband stage includes the following shared and discrete components including: an equalizer 274 to mitigate channel impairments which is coupled to the output of the DFTs 272A-B. The received streams at the output of the equalizer are subject to demapping and deinterleaving in a corresponding number of the demapper/deinterleavers 276A-B. Next the received stream(s) are decoded and descrambled in the decoder and descrambler component 278, followed by de-framing in the deframer 280. The received communication is then passed to the WMAC component 230 where it is decrypted with the decryption circuit 234 and placed in the appropriate upstream hardware queue 232 for upload to the Internet 136.

The WiSoC-RC 130 also includes a remote and local (R/L) controller 202. The R/L controller offers a configurable mix of local and remote control sources for the aforesaid plurality of components which make up the transmit and receive path. The R/L controller includes: a remote and local (R/L) switch fabric 212 and local control circuits 204A-E.

The R/L switch fabric 212 is communicatively coupled to a) the "Remote Services Cloud" 146, which may be instantiated on one or remote servers, which provide the service allocator, cross-service fabric and remote services discussed above. The remote services each include the capability of operating as a remote control source, remotely controlling a corresponding portion of the transceivers wireless operations. The R/L switch fabric is also coupled to b) the local control circuits 204A-E, each of which include the capability of locally controlling a corresponding portion of the transceiver's wireless operations, e.g. access control circuit 204A, channel selection circuit 204B, link optimization circuit 204C, traffic scheduling circuit 204D, and Mesh discovery and routing table creation circuit 204E. The R/L switch fabric also has connections to c) the plurality of components which make up the transmit and receive path.

The R/L switch fabric is configurable with the configured switch state determining the mix between local and remote control sources that will control the related portions of the transceiver's wireless operations via connections to the related portions of the plurality of transmit and receive path components.

In the example shown in FIG. 2A three switch fabric connections are shown. The R/L switch fabric has connections to the VCO 266, and Filters 264A-B, 256A-B which it can couple to either a local channel selection circuit 204B or remote control source for controlling the channel selection process, e.g. the WLAN optimization service 150C. In the example shown, the switch fabric switch element 214B couples the local channel control circuit 204B to the aforesaid VCO and filters components to provide local control of the channel selection portion of the transceivers operation.

The R/L switch fabric has connections to the transmit and receive amplifiers 258A-B, 260AB which can be used to control the transmit power and the receive sensitivity for the different needs of each communication link between the WAP and a corresponding one of the associated stations. The R/L switch fabric can couple these amplifiers to either a local link optimization circuit 204C or remote control source for controlling the link optimization process, e.g. the WLAN optimization service 150C. In the example shown, the switch fabric switch element 214C couples both the local link optimization circuit as well as to the cloud's WLAN optimization service for collaborative local and remote control of the link optimization portion of the transceiver's operation.

The R/L switch fabric has connections to the hardware queues 232 of the WMAC circuit component shared between the transmit and receive paths, which it can couple to either a local traffic scheduling circuit 204D or a remote control source for controlling the transceiver's traffic scheduling process, e.g. the WLAN optimization service 150C. In the example shown, the switch fabric switch element 214D couples the remote WLAN optimization service 150C to the aforesaid WMAC hardware queues 232 to provide remote control of the queue scheduling, portion of the transceiver's operation.

In the example shown in FIG. 2A and discussed above, the R/L fabric switch is configured to provide a mix of local and remote control sources for the portions of the transceivers wireless operations related to channel selection, link optimization, and traffic scheduling that are respectively: local, collaborative, and remote.

In an embodiment of the invention a hardware access circuit 216 is provided between the R/L fabric switch 212 and the plurality of components in the baseband and AFE-RF stages with make up the transmit and receive paths. This circuit provides standardized access points to the plurality of components, even when for example the RFIC is instantiated as a separate chip.

In another embodiment of the invention a load balancer 208 couples the R/L switch fabric to the remote services cloud 146. The load balancer can monitor the DSL/Cable/Fiber and in the event of congestion of subscriber communication traffic can throttle remote control traffic between the transceiver and the remote services cloud.

In another embodiment of the invention a R/L evaluator 210 couples the R/L switch fabric to the remote services cloud 146. The R/L evaluator can monitor a remote control source, e.g. the WLAN optimization service 150C and in the event of a failure of that remote service, can reconfigure the R/L switch fabric to reconnect the corresponding local control circuit, thus avoiding an interruption in the corresponding portion of the transceiver's operation.

In another embodiment of the invention the R/L controller includes a mode switch which determines whether the R/L switch fabric is configured by a remote server instantiating the WLAN service allocator 149 in the remote services cloud, or self-configured by the transceiver itself. In the "Slave" mode the R/L switch fabric is configured with a setup command 200 from the remote services cloud. In the "Autonomous" mode the R/L switch fabric is self configured after a capabilities exchange with the remote services cloud. In an other embodiment of the invention the WiSoC-RC 130 R/L switch fabric is exclusively self-configured and has no mode switch. In another embodiment of the invention the WiSoC-RC 130 R/L switch fabric is exclusively cloud configured and has no mode switch.

In another embodiment of the invention a switch table 222 controls the configuration of the R/L switch fabric which lists for each portion of the WiSoC-RC chips wireless operations, the control source and the associated one(s) of the transmit and receive path components. Where the WiSoC-RC chip operates as a slave the switch table is provided by the remote WLAN services cloud. Where the WiSoC-RC chip operates autonomously the R/L switch fabric is self configured after a capabilities exchange with the remote services cloud.

In another embodiment of the invention one or more circuits of the R/L controller may be implemented on a very large scale integrated circuit processor using program code 224 in storage 220.

In another embodiment of the invention the R/L fabric switch has access to feeds for monitoring the wireless operational parameters of one or more of the plurality of components which make up the transmit and receive path. The R/L switch fabric is configured to switchably connect selected ones of the feeds with the related ones of the local and remote control sources.

In another embodiment of the invention the R/L fabric switch has access to sockets for controlling the wireless operational parameters of one or more of the plurality of components which make up the transmit and receive path. The R/L switch fabric is configured to switchably connect selected ones of the sockets with the related ones of the local and remote control sources.

Some cloud services such as the remote home security service 150E may piggyback on existing wireless operations, without controlling those operations, by for example, obtaining frequent feeds of the implicit soundings available as each downlink packet is acknowledged by the receiving station, or as e explicit sounding feedback matrices from the RX packet processor circuit 238 of the WMAC circuit 230. The remote home security service may also use a collaborative R/L switch state with the local link optimization circuit 204C and sockets related to setting the interval for explicit channel sounding and related feedback to increase the frequency of soundings controlled by the link optimization circuit.

FIG. 2B shows an exploded view of an embodiment of an element 214C of the R/L switch fabric for handling the switching of feeds from and sockets to the related ones of the plurality of components associated with the link optimization portion of the transceiver's wireless operations. In the example shown the portion of the transceiver's wireless operation related to link optimization are collaboratively operatively controlled by the local link optimization control circuit 204C and by the WLAN optimization service available in the remote service cloud 146. In accordance the feed switches 284A-B are set to deliver the related feed(s) to both the remote services cloud 146 and to the local link optimization control circuit 204C. The socket switches 286A-B are set so that the local link optimization control circuit has primary socket control via switch 286A and the remote services cloud, e.g. the WLAN optimization service 150C, has secondary socket control via coupling via switch 286B to the local link optimization control circuit. The local link optimization circuit in this embodiment of the invention accepts the cloud's socket input as a "suggestion" which the local link optimization control circuit can compare or evaluate against its own socket output.

The following switch tables 1A-1D show representative feeds and sockets available on an embodiment of the WiSoc-RC transceiver of the current invention. Table 1A shows the Feeds available from the plurality of components which make up the WAP's Tx/Rx paths, when the WAP is using a single channel, power level, bandwidth . . . etc. for all links, as in the IEEE 802.11n and prior standard versions. Table 1B shows the Feeds available from the plurality of components which make up the WAP's Tx/Rx paths, when different channels, power levels, bandwidth, etc. can be used for each link, as in the IEEE 802.11ac and subsequent standards. Table 1C shows the Sockets available to the plurality of components which make up the WAP's Tx/Rx paths, when the WAP is using a single channel, power level, bandwidth . . . etc. for all links, as in the IEEE 802.11n and prior standard versions. Table 1D shows the Sockets available to the plurality of components which make up the WAP's Tx/Rx paths, when different channels, power levels, bandwidth, etc. can be used for each link, as in the IEEE 802.11ac and subsequent standards.

There are five columns in each table. The $1^{st}$ column categorizes the feed or socket types. The $2^{nd}$ column lists the feed/socket description. The $3^{rd}$ column lists the feed source component or the socket input component among the plurality of components which make up the transmit and receive path of the baseband and AFE-RF stages 226-228 as shown in FIG. 2A. The $4^{th}$ column lists the representative local control circuit(s) that require each feed or socket. The $5^{th}$ column set shows the R/L fabric switch configuration setup, for the example shown in FIG. 2, with the letters: "L", "C", and "R" indicating respectively local, collaborative, and remote control of the corresponding feeds and sockets. Any capabilities exchange between the chip and the cloud may include a copy of these tables. Any switch setup by the cloud or the chip involves setting the values, e.g. R/L/C, in the $5^{th}$ column. In other embodiments of the invention additional columns may indicate additional switch criteria. A $6^{th}$ column may indicate the desired state of selected local circuits, e.g. activated or deactivated. A $7^{th}$ column may indicate for each feed the required temporal frequency at which a given feed is to be delivered, e.g.: upon the occurrence of a related event, or upon the passage of a given amount of time, or upon the reaching of an upper or lower threshold, or upon a relative change in magnitude with respect to the last such feed.

| Switch Table 1A WAP | WAP FEED (SELF) | Component which provides Feed | Local Control Curcuit(s) | Switch Config R/L/C |
|---|---|---|---|---|
| Capabilities Setup | Capabilities WAP | Boot ROM (Not Shown) | Bootup | |
| | Location WAP (GPS) | GPS Chip (Not shown) | Bootup | |
| | Channels Availability DFS | VCO, Filter, AGC, WMAC(Med_A) | Channel | L |
| | Bandwidth | Filters (TX-RX) | Channel | L |
| | Association Table # Stations | WMAC (Node Table) | Access | |
| | TX Power | Amplifier | Access | |
| | Rx Sensitivity | LNA and AGC | Links | C |
| Performance | Broadband UpStream Limit | EMAC | Schedule | R |
| | Broadband DownStream Limit | EMAC | Schedule | R |
| | Free Airtime | WMAC(Pkt TxRX), (Med_Access), AGC | Schedule | R |

| Switch Table 1B Links (A,N) | WAP FEED (LINKS-STA) | Component which provides Feed | Local Control Circuit(s) | Switch Config. R/L/C |
|---|---|---|---|---|
| Capabilities | Device Capability/Type | WMAC (Pkt Tx/Rx) | ACCESS, CHANNEL | L,L |
| Link Setup | Channel Selection | VCO, AGC | Channel | L |
| | Bandwidth | Filter TX and RX | Channel | L |
| | TX Power | Amplifier | Links | C |
| | RX Sensitivity | LNA and Carrier Sense(AGC) | Links | C |
| | RSSI | AGC | Links | C |
| | SNR | DEMAPPER SLICER NOT WORK | Links | |
| | Sounding "H" or "V" | WMAC (Pkt Rx) | Links | C |
| | Beamforming Matrix "V"/"W" | WMAC (Pkt Tx) | Links | C |
| | # Streams | WMAC (Pkt Tx) | Links | |
| | MCS | WMAC (Pkt Tx) | Links | C |
| | MU v SU | WMAC (Pkt Tx) | Links | C |
| | Sniff Mode Local/Loc. + Neighbor | WMAC (Pkt Rx) | Links | C |
| Link Demand | Data Type Uplink and Downlink | WMAC (Pkt Tx/Rx) | Schedule | R |
| | Queue Size | WMAC (Hdw Queue) | Schedule | R |
| | QoS updates/Revisions | WMAC (Hdw Queue), (Med_Access) | Schedule | R |
| | Packet Size | WMAC (Pkt Tx/Rx) | Schedule | R |
| Link Performance | Packet Error Rate | WMAC (Pkt Tx/Rx) | Links | C |
| | Throughput Actual | WMAC (Pkt Tx/Rx) | Links | C |
| | Free Airtime | ACG Free Airtime | Links | C |
| | Source IP Address | WMAC (Pkt Tx/Rx) | Access | |
| | Destination IP Address | WMAC (Pkt Tx/Rx) | Access | |
| Link Overhead | Fine Time Measurement | WMAC (Pkt Tx/Rx) | | |
| | MESH Table Distribution | WMAC (Pkt Tx/Rx) | Mesh | |

| Switch Table 1C Sockets | WAP SOCKETS SELF | Component which provides Socket | Local Control Circuit(s) | Switch Config R/L/C |
|---|---|---|---|---|
| WAP Setup | Channel Select WLAN | OSC, Tx/Rx Filters | Channel | L |
|  | Bandwidth Set | Tx/Rx Filters | Channel | L |
|  | Association Set/Update (AAA) | WMAC (Node Table) | Access |  |
|  | Power TX set | TX Amplifier | Links | C |
|  | RX Sensitivity set | RX Amplifier | Links | C |
|  | SSID set | WMAC (Pkt Tx/Rx), (Node-Table) | Access |  |
| 5. Table 1D WAP SOCKETS LINKS-STA ||||| 
| Link Setup | Channel Select | OSC, Tx/Rx Filters | Channel | L |
|  | Bandwidth Set | Tx/Rx Filters | Channel | L |
|  | Power TX set | Amp | Links | C |
|  | RX Sensitivity set | LNA | Links | C |
|  | Beamforming/SMM set | Spatial Mapper | Links | C |
|  | Streams #set | WMAC (Pkt Tx/Rx) | Links | C |
|  | MCS | WMAC (Pkt Tx/Rx) | Links | C |
|  | QOS update/set | WMAC (H.Queue),(Med_Access) | Schedule |  |
|  | Packet Size select | WMAC (Pkt Tx) | Schedule | R |
|  | MU v SU set | WMAC (Pkt Tx) | Schedule | R |
|  | Source IP Address Block | WMAC (Pkt Rx) | Access |  |
|  | Destination IP Address Block | WMAC (Pkt Tx/Rx) | Access |  |
| Link Overhead | Fine Time Measurement Initiate | WMAC (Pkt Tx/Rx) | ? |  |
|  | MESH Table Distribution Initiate | WMAC (Pkt Tx/Rx) | Mesh & Links |  |

Figure 3:
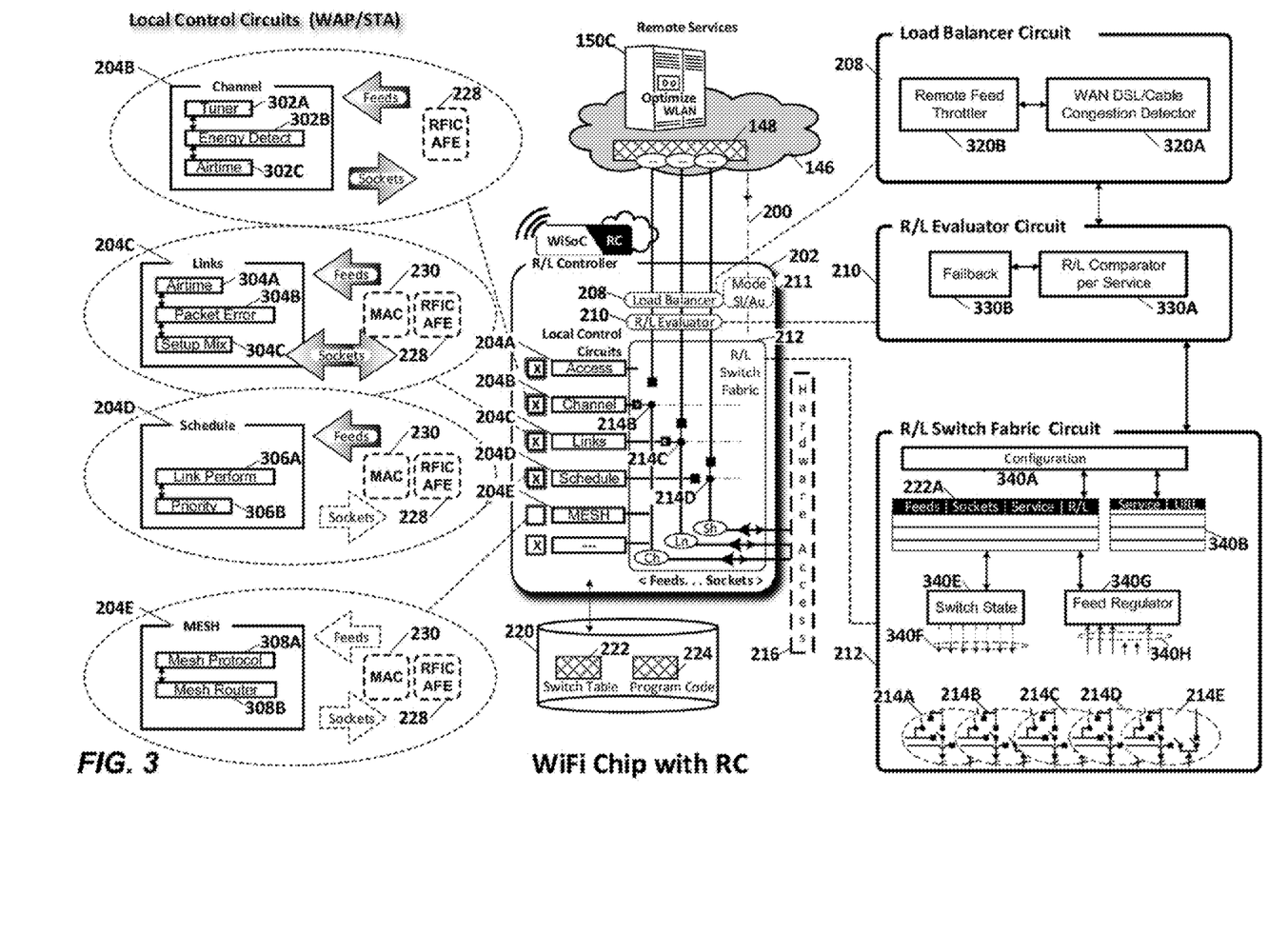
FIG. 3 is an exploded hardware block diagram of the remote/local controller of the wireless transceiver shown in FIG. 2A.

FIG. 3 is an exploded hardware block diagram of the remote/local controller 202 of the wireless transceiver shown in FIG. 2A. On the left side of FIG. 3, exploded hardware views of an embodiment of the local control circuits 204B-204E is shown. On the right side exploded hardware views of an embodiment of the load balancer, R/L evaluator, and R/L switch fabric circuits is shown.

The local channel control circuit 204B includes a tuner 302A and energy detector 302B and an airtime calculator 302C. In the R/L fabric switch configuration shown by way of example in FIG. 2A the portion of the transceivers wireless operations related to channel control are set to local control. When set to the local control switch state, the local channel control circuit accepts feeds from and provides input to the sockets of the AFE and RFIC stage 228. The tuner uses sockets of the VCO and filters of the RFIC to tune to a selected channel. The energy detector accepts feeds from the receive path AGC to determine the energy level of any received signal and the airtime calculator 302C uses those AGC levels over time to determine the free airtime on the selected channel. After monitoring of one or more channels, the channel tuner 302A uses the socket(s) to the AGC and filters to select an acceptable communication channel. The selection of communication channels may be done for all links on one communication channel, or for each link on separate communication channels. In the latter case, consistent with the IEEE 802.11ax specification the allocation of resource units for each link, including corresponding portions of the orthogonal frequency division multiple access (OFDMA) is handled by the channel selector via its connection to the WMAC and specifically the node table 239 which it maintains for the WMAC. As discussed above, the node table lists for each node/station on the WLAN, the station's capabilities, the corresponding encryption key, and the priority associated with its communication traffic. Where the WAP is IEEE 802.11ax compliant, the node table also includes the OFDMA frequency allocations for each link, as allocated by the channel tuner 302A via its write access to the node table 239.

The local link control circuit 204C includes an airtime monitor 304A, a packet error evaluator 304B, and a link setup optimizer 304C. In the R/L fabric switch configuration shown by way of example in FIG. 2A the portion of the transceivers wireless operations related to link optimization control are set to collaborative. When set to the collaborative switch state, the local link optimization control circuit accepts feeds from and provides input to the sockets of the WMAC 230 and the AFE and RFIC stage 228. The link setup optimizer uses sockets to input into the WMAC and RFIC-AFE stage 228, different combinations of transmit power, modulation and coding schema (MCS), and packet size, for transmission of user data on a given link between the WAP and a station. The packet error evaluator uses feeds from the MAC indicating packet retransmission requests to determine the packet error rate (PER) for each of the different combinations. Concurrently, the airtime monitor uses feeds from the MAC to determine the amount of time in a given interval required to transmit the user data. The link setup optimizer uses the PER and airtime evaluations to find the optimum combination of power, MCS and packet size for transmitting the user data on the link. Each link is evaluated individually. The R/L fabric switch state for the portion of the transceivers wireless operations related to link optimization is, in the example shown in FIG. 2A, set to collaborative. As a result of that switch state the feeds received by the local link optimization control circuit are also received by the remote clouds WLAN optimization service 150C. The switch state of the sockets can be set to make either the remote or the local service the primary controller of the related sockets. In the example shown in FIG. 2A the switch state as to sockets is shown with the local link optimization having primary control of the sockets related to link optimization, and the cloud's WLAN optimization service 150C in a secondary role. As such the cloud's input to the related sockets accessible by the R/L switch fabric are passed to the local link optimization controller, rather than the WMAC and AFE-RFIC, where they are included in the evaluations made by the link setup optimizer 304C, and as such can be expected to alter the socket inputs it makes.

The local traffic scheduling control circuit 204D includes a link performance evaluator 306A and a traffic priority balancer 306B. In the R/L fabric switch configuration shown by way of example in FIG. 2A the portion of the transceiver's wireless operations related to traffic scheduling are set to remote. When set to the remote switch state, the R/L switch fabric may be set to pass related feeds to the local traffic scheduling circuit, but the R/L switch fabric does not provide it any connections to the sockets required to control traffic scheduling. Thus, the R/L switch fabric maintains the local traffic scheduling control circuit on standby, so that in the event of a failure on the part of the corresponding remote cloud service scheduling can be immediately returned to local control. The performance evaluator accepts feeds from the WMAC 230 and AFE-RFIC from which it determines the throughput rate on each link for each type of traffic. The priority circuit 306B determines the traffic type(s), queue lengths, and corresponding QOS for the traffic on each link from a corresponding feed from the WMAC and sets random backoff ranges for each traffic type, via a socket to the WMAC hardware queue 232, which optimizes traffic scheduling.

The Mesh discovery and routing table creation circuit 204E includes a Mesh protocol circuit 308A and a Mesh router circuit 308B. When active, the Mesh protocol circuit aggregates link and link hop information from the associated stations using for example, the IEEE 802.11s protocol, and the Mesh router circuit determines the optimal Mesh routing table from the aggregated link and link hop information and distributes it to the associated stations. In the R/L fabric switch configuration shown by way of example in FIG. 2A the portion of the transceivers wireless operations related to Mesh control 204E are set to remote control and the local Mesh control 204E is deactivated entirely including receiving no feeds and having access to no sockets.

In an embodiment of the invention any one of the local control circuits can be deactivated by the R/L controller, as for example in the case where the corresponding portion of the transceiver's wireless operation is controlled by one of the related services on the remote cloud.

The R/L Switch Fabric Circuit 212 includes: a configuration circuit 340A, a switch table 222A, a remote resource location table 340B, a switch state circuit 340E, a feed regulator circuit 340G, and a plurality of switch elements, e.g. 214A-E. The configuration circuit utilizes one or more of the uniform resource locators (URL)s in the remote resource location table to locate either or both the WLAN service allocator 149 (see FIG. 1) or each remote service directly, e.g. remote services 150A-K (see FIG. 1). If the WiSoc-RC is operating as a slave, the configuration circuit presents the remote services with its capabilities as indicated in the switch table in terms of local circuits, feeds and sockets. The configuration circuit then accepts switch setup commands, e.g. "R", "C", "L", for each portion of its wireless operations, which are entered into the switch table 222A. If the WiSoc-RC is operating autonomously, the configuration circuit contacts the remote services and determines their capabilities, in terms of required feeds, sockets, and the related local circuits if any that the remote services can augment or supplant. The WiSoc-RC and specifically the configuration circuit then self configures the switch setup commands, e.g. "R", "C", "L", for each portion of its wireless operations, which are entered into the switch table 222A. The switch state circuit 340E then uses its control connections 340F to each of the switch elements, e.g. switch elements 214A-E, to set the mix of feeds and sockets to local or remote control sources as indicated in the switch table 222A. The switch state circuit also may, in an embodiment of the invention, disable any local control circuits if the corresponding portion of the WiSoc-RC's wireless operations are setup for a remote control source in the remote services cloud. The feed regulator 340 regulates the temporal frequency at which each one of the active feeds 340H is to be delivered, including feeds to one or more remote control sources in the remote services cloud. The temporal frequency of each feed can be varied independently. Each feed may have a temporal frequency based on: the occurrence of a related event, or upon the passage of a given amount of time, or upon the reaching of an upper or lower threshold, or upon a relative change in magnitude with respect to the last such feed.

The R/L switch fabric may be implemented as a centralized switching circuit as shown above, or as a distributed switching circuit without departing from the scope of the Claimed invention. In the distributed embodiment of the R/l switch fabric, the various switching elements of R/L switch fabric, e.g. switch elements 214A, 214B, 214C, 214D, 214E, are integrated with related ones of the local control circuits.

The R/L evaluator circuit 210 includes a remote and local comparator 330A, and a failback circuit 330B. The remote and local comparator in an embodiment of the invention monitors those portions of the WiSoc-RC's wireless operations that are switchably set to a remote control source. In the event of a failure of one of the remote control source(s) that are part of the mix, then the R/L comparator notifies the failback circuit 330B which initiates a switchable reconnection by the R/L switch fabric of a subset of the plurality of components in the baseband 226 and or AFE-RF 228 stages from a remote control source, e.g. WLAN optimization service 150C on the remote services cloud server to a local control source based on a failure of the remote control source.

The R/L evaluator circuit 210 includes a remote and local comparator 330A, and a failback circuit 330B. The remote and local comparator in an embodiment of the invention monitors those portions of the WiSoc-RC's wireless operations that are switchably set to a remote control source. In the event of a failure of one of the remote control source(s) that are part of the mix, then the R/L comparator notifies the failback circuit 330B which initiates a switchable reconnection by the R/L switch fabric of a subset of the plurality of components in the baseband 226 and or AFE-RF 228 stages from a remote control source, e.g. WLAN optimization service 150C on the remote services cloud server, to a local control source based on a failure of the remote control source.

The load balancer circuit 208 includes a wide area network (WAN) congestion detector 320A, and a remote feed throttler 320B. The WAN congestion detector monitors the subscriber's communication traffic passing through the WiSoc-RC as well as the WiSoc-RC's own traffic, e.g. feeds and sockets, with the remote service cloud. If a current or pending bottleneck in subscriber traffic is detected, the remote feed throttler will in response throttle one or more feeds or sockets between the WiSoc-RC and the remote services cloud, until the congestion of subscriber traffic is relieved.

Figure 4:
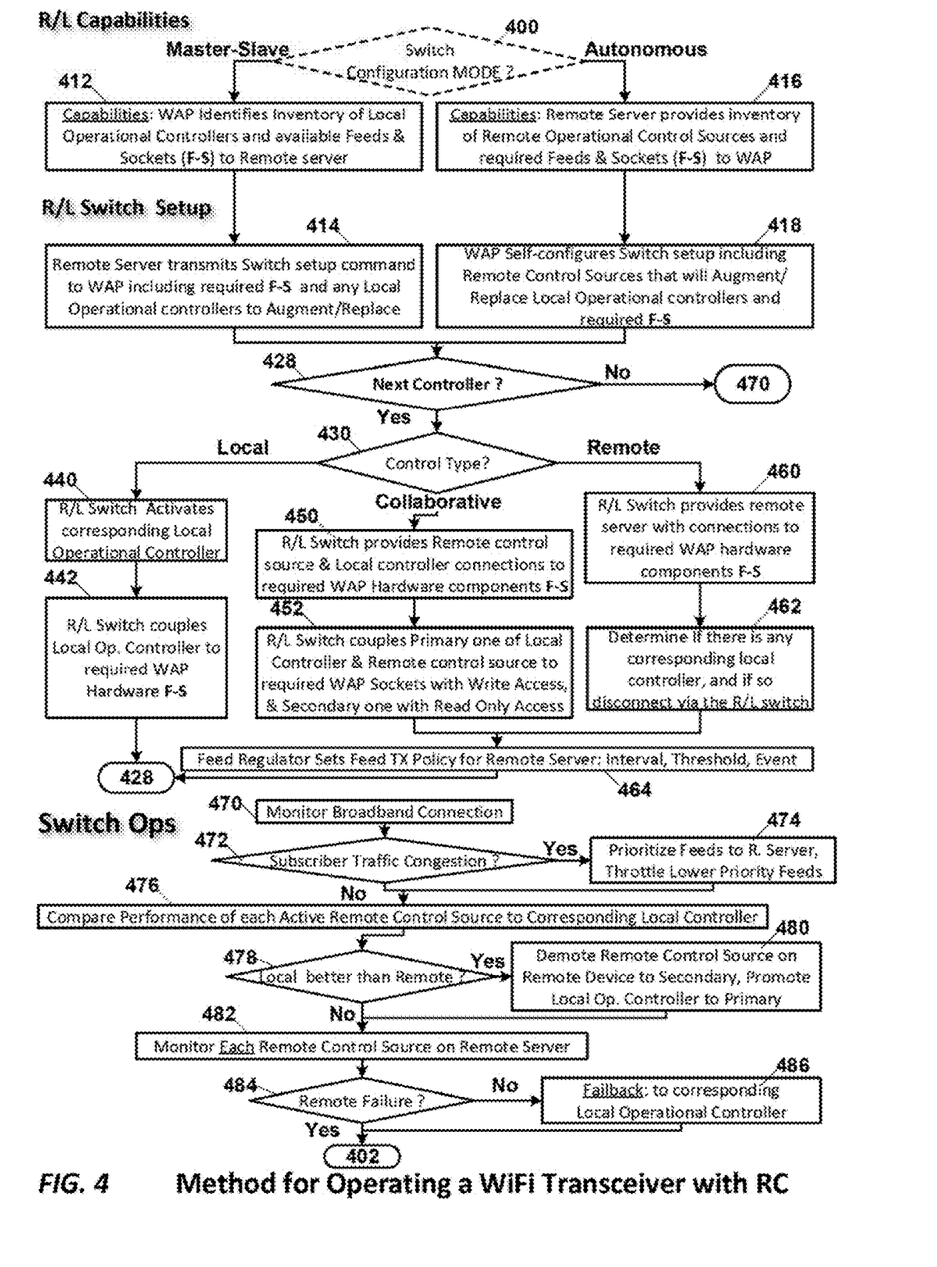
FIG. 4 is a process flow diagram of processes associated with operating the wireless transceiver in accordance with an embodiment of the current invention.

FIG. 4 is a process flow diagram of processes associated with operating the wireless transceiver with remote control, a.k.a. WiSoc-RC, in accordance with an embodiment of the current invention. The WiSoc-RC may be operative as either a WAP or a station without departing from the scope of the claimed invention.

In embodiments of the invention in which the WiSoc-RC is manufactured as an "autonomous" transceiver with RC capability processing begins with process 416. In process 416 the WiSoc-RC determines the capabilities of, the remote services available on, the remote services cloud. In an embodiment of the invention the remote cloud services are instantiated on a remote server which provides the WiSoc-RC with an inventory of remote operational control sources and required feeds and sockets to the WiSoc-RC. Next in process 418 the WAP self configures the R/L switch table 222 including the desired mix of local and remote control sources, and associated feeds and sockets, that will augment or replace local operational controllers available on the WiSoc-RC itself. Control is then passed to decision process 428.

In embodiments of the invention in which the WiSoc-RC is manufactured as a "slave" transceiver with RC capability, processing begins with process 412. In process 412 the WiSoc-RC identifies to the remote services cloud, or the remote server instantiating same, its inventory of local operational controllers, e.g. the access, channel, link, schedule, and Mesh control circuits 204A-E shown in FIG. 2A. In an embodiment of the invention the WiSoc-RC also identifies to the remote services cloud/server all of its available feeds and sockets. Next in process 414 the WAP/WiSoc-RC receives from the remote server or remote services cloud a switch setup command including the required feeds and sockets and any local operational controllers that the remote services cloud will augment or replace. These setup command settings are then written to the R/L switch table, 222 (See FIG. 2A and FIG. 3). Control is then passed to decision process 428.

In embodiments of the invention in which the WiSoc-RC is manufactured with a factory or field settable mode control switch 211 (See FIG. 2A), a switch mode determination in decision process 400 determines whether the capabilities identification and switch setup processes discussed above follows the "slave" path 412-414 or the "autonomous" path 416-418. [06'] Next, in decision process 428, each portion of the WiSoc-RC's wireless operations is configured to conform with the settings in the R/L switch table 222. The settings for each controller are set. Each controller controls a corresponding portion of the WiSoc-RC's wireless operations. Not all remote controllers, a.k.a. remote control sources, in the remote services cloud, have a related local control circuit. The RC capability of the WiSoc-RC allows the WiSoc-RC to instantiate entirely new controllers, not part of its original circuitry, e.g. a remote MESH control capability instantiated on the WiSoc-RC which does not itself have such capability. When there are no more control circuits to set, control passes to process 470. The first step in the setup of a controller is to determine its control type, e.g. local, remote or collaborative, which is determined in decision process 430. This determination is based on the settings for the corresponding controller in the switch setup table as established in the corresponding one of processes 414 or 418 discussed above.

Where a determination is made in process 430 that the next controller is to be setup using a local control source, the R/L switch in process 440 activates the corresponding local operational controller, e.g. the channel controller 204B shown in FIG. 2A. Next, in process 442 the R/L switch couples the local operational controller to the required subset of the WAP's transmit and receive path hardware components, including the feeds and or sockets associated therewith. Control then returns to decision process 428 for the setup of the next controller.

Where a determination is made in process 430 that the next controller is to be setup using a remote control source the R/L switch fabric in process 460 is switchably set to provide the remote server/remote cloud services with the connections to the required subset of the WAP's transmit and receive path hardware components, including the feeds and or sockets associated therewith. Next in process 462 a determination is made as to whether there is any corresponding local controller on the WiSoc-RC and if so the R/L switch is set to disconnect or place on standby that local controller. Next in process 464 the feed regulator sets the feed policy for feeds to the remote server. This sets the temporal frequency of each feed to the remote server/remote services cloud, based on setup parameters in the switch table including feed regulation based on: the occurrence of a related event, or upon the passage of a given amount of time, or upon the reaching of an upper or lower threshold, or upon a relative change in magnitude with respect to the last such feed. Control then returns to decision process 428 for the setup of the next controller.

Where a determination is made in process 430 that the next controller is to be setup using a collaborative control source the R/L switch fabric in process 450 is switchably set to provide both the remote server/remote cloud services and the corresponding local controller with the connections to the required subset of the WAP's transmit and receive path hardware components, including the feeds and or sockets associated therewith. Next in process 452 the R/L switch couples, based on the settings in the switch table, the primary one of the local controller and the remote control source to the required sockets with write access, and the secondary one with read only access to the required sockets. In this switch state the secondary one of the control sources provides suggestions as to socket input to the primary one of the control sources for inclusion in its decision making. Control then returns to decision process 428 for the setup of the next controller.

Once all control sources have been processed, control passes to the switch operation processes including process 470. In process 470 the WiSoc-RC's broadband connection is continuously monitored. If congestion of subscriber traffic is identified in decision process 472 then control is passed to process 474, else to process 476. In process 474 the feeds to the remote server or remote services cloud are prioritized and lower priority feeds are throttled. Control then passes to process 476. In process 476 the performance of each active remote control source is compared to each corresponding local controller if active. This capability is utilized when a portion of the WISoc-RC transceivers wireless operations is set for collaborative operational control. Where in decision process 478 a determination is made that a local controller is providing better control decisions than the collaborative remote control source control is passed to process 480, otherwise to process 482. In process 480 the remote control source is demoted to a secondary control relationship and the local operational controller is promoted to primary control responsibility of the corresponding portion of the WiSoc-RC wireless operations. Control then passes to process 482. In process 482 each remote control source on the remote server/remote services cloud is monitored. If in decision process 484 a failure of the remote service is detected then control is passed to process 486, otherwise to the corresponding one of the capabilities determination processes: 400, 412, 416. Failure conditions include: an interruption in the communication link with the remote service, an unacceptable latency in the receipt of socket commands from the remote service for example. When such a failure condition is detected then in process 486 a failback Is initiated in which the corresponding local operational controller on the WiSoc-RC is switchably reconnected to the required feeds and sockets to resume control of the corresponding portion of the WiSoc-RC transceiver's wireless operation. Control then also passes to the corresponding one of the initial capabilities determination processes, 400, 412 or 416.

The components and processes disclosed herein may be implemented in a combination of software, circuits, hardware, and firmware, coupled to the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless transceiver apparatus configured to support wireless communications with associated transceiver nodes on at least one selected wireless communication channel on a wireless local area network (WLAN); and the wireless transceiver apparatus comprising:
   a plurality of components coupled to one another to form transmit and receive paths for processing wireless communications on the at least one selected wireless communication channel;
   local control circuits each of which controls a distinct portion of the wireless transceiver's wireless operations via connections to a related subset of the plurality of components;
   a Remote and Local (R/L) switch fabric configured to switchably connect each of the subsets of the plurality of components to at least one of, a related one of the local control circuits and a remote server providing remote control of a related portion of the wireless transceiver's wireless operations, to enable a configurable mix of local and remote control sources among the distinct portions of the wireless transceiver's wireless operations; and
   a mode selection circuit coupled to the R/L switch fabric to select one of an autonomous mode and a slave mode for setup of the R/L switch fabric, where the mix of local and remote sources are configured in the slave mode by the remote server and in the autonomous mode by the wireless transceiver.

2. The wireless transceiver apparatus of claim 1, further comprising:
   the R/L switch fabric responsive to a setup command from the remote server to configure the mix of local and remote control among the distinct portions of the wireless transceiver's wireless operations.

3. The wireless transceiver apparatus of claim 1, further comprising:
   the R/L switch fabric responsive to a capabilities exchange with the remote server to self-configure the mix of local and remote control among the distinct portions of the wireless transceiver's wireless operations.

4. The wireless transceiver apparatus of claim 1, further comprising:
   the plurality of components includes components providing feeds for monitoring associated wireless operational parameters; and
   the R/L switch fabric switchably connecting selected ones of the feeds with the related ones of the local and remote control sources.

5. The wireless transceiver apparatus of claim 1, further comprising:
   the plurality of components includes components providing sockets for controlling associated wireless operational parameters; and
   the R/L switch fabric switchably connecting selected ones of the sockets with related ones of the local and remote control sources.

6. The wireless transceiver apparatus of claim 1, further comprising:
   the plurality of components includes components providing feeds for monitoring associated wireless operational parameters;
   the R/L switch fabric switchably connecting selected ones of the feeds with related ones of the local and remote control sources; and including;
   a feed regulator circuit to individually regulate a temporal frequency of each feed to the remote server.

7. The wireless transceiver apparatus of claim 1, further comprising:
   an R/L evaluator circuit coupled to the R/L switch fabric to initiate switchable reconnection by the R/L switch fabric of a subset of the plurality of components coupled to a remote control source on the remote server to a local control source on the wireless transceiver, based on a failure of the remote control source.

8. The wireless transceiver apparatus of claim 1, further comprising:
   the plurality of transmit and receive components configured as one of a Wireless Access Point (WAP) transceiver, a station transceiver, and a WiFi transceiver on a very large scale integrated circuit.

9. A method for operating a wireless transceiver configured to support wireless communications with associated transceiver nodes on at least one selected communication channel on a wireless local area network (WLAN); and the method comprising:
   providing a plurality of components coupled to one another to form transmit and receive paths for processing wireless communications on the at least one selected wireless communication channel;
   providing local controllers each of which controls a distinct portion of the wireless transceiver's wireless operations via connections to a related subset of the plurality of components;
   switchably connecting each of the subsets of the plurality of components to at least one of, a related one of the local controllers and a remote server providing remote control of a related portion of the wireless transceiver's wireless operations, to enable a configurable mix of local and remote control sources among the distinct portions of the wireless transceiver's wireless operations; and
   selecting one of an autonomous mode and a slave mode for setup of the switchably connecting act, where the mix of local and remote sources are configured in the slave mode by the remote server and in the autonomous mode by the wireless transceiver.

10. The method for operating the wireless transceiver of claim 9, further comprising:
configuring the mix of local and remote control among the distinct portions of the wireless transceiver's wireless operations, responsive to a setup command from the remote server.

11. The method for operating the wireless transceiver of claim 9, further comprising:
self-configuring the mix of local and remote control among the distinct portions of the wireless transceiver's wireless operations, responsive to a capabilities exchange with the remote server.

12. The method for operating the wireless transceiver of claim 9, further comprising:
providing the plurality of components including feeds for monitoring associated wireless operational parameters; and
switchably connecting selected ones of the feeds with the related ones of the local and remote control sources.

13. The method for operating the wireless transceiver of claim 9, further comprising:
providing the plurality of components including sockets for controlling associated wireless operational parameters; and
switchably connecting selected ones of the sockets with related ones of the local and remote control sources.

14. The method for operating the wireless transceiver of claim 9, further comprising:
providing the plurality of components including feeds for monitoring associated wireless operational parameters;
switchably connecting selected ones of the feeds with related ones of the local and remote control sources; and
individually regulating a temporal frequency of each feed to the remote server.

15. The method for operating the wireless transceiver of claim 9, wherein the switchably connecting act further comprises:
reconnecting a subset of the plurality of components coupled to a remote control source on the remote server to a local control source responsive to a failure of the remote control source.

16. The method for operating the wireless transceiver of claim 9, further comprising:
operating the wireless transceiver as one of; a Wireless Access Point (WAP) transceiver, a station transceiver, and a WiFi transceiver on a very large scale integrated circuit.

17. A wireless transceiver apparatus configured to support wireless communications with associated transceiver nodes on at least one selected wireless communication channel on a wireless local area network (WLAN); and the wireless transceiver apparatus comprising:
a plurality of components coupled to one another to form transmit and receive paths for processing wireless communications on the at least one selected wireless communication channel;
local control circuits each of which controls a distinct portion of the wireless transceiver's wireless operations via connections to a related subset of the plurality of components;
a Remote and Local (R/L) switch fabric configured to switchably connect each of the subsets of the plurality of components to at least one of, a related one of the local control circuits and a remote server providing remote control of a related portion of the wireless transceiver's wireless operations, to enable a configurable mix of local and remote control sources among the distinct portions of the wireless transceiver's wireless operations and the R/L switch fabric further responsive to a determination as to collaborative operational control of one distinct portion of the wireless transceiver's wireless operations provided by the related one of the local control circuits and by the remote server, to switchably connect the one related subset of the plurality of components to both the related one of the local control circuits and to the remote server.

18. The wireless transceiver apparatus of claim 17, further comprising:
the R/L switch fabric responsive to a setup command from the remote server to configure the mix of local and remote control among the distinct portions of the wireless transceiver's wireless operations.

19. The wireless transceiver apparatus of claim 17, further comprising:
the R/L switch fabric responsive to a capabilities exchange with the remote server to self-configure the mix of local and remote control among the distinct portions of the wireless transceiver's wireless operations.

20. The wireless transceiver apparatus of claim 17, further comprising:
the plurality of components includes components providing feeds for monitoring associated wireless operational parameters; and
the R/L switch fabric switchably connecting selected ones of the feeds with the related ones of the local and remote control sources.

21. The wireless transceiver apparatus of claim 17, further comprising:
the plurality of components includes components providing sockets for controlling associated wireless operational parameters; and
the R/L switch fabric switchably connecting selected ones of the sockets with related ones of the local and remote control sources.

22. The wireless transceiver apparatus of claim 17, further comprising:
the plurality of components includes components providing feeds for monitoring associated wireless operational parameters;
the R/L switch fabric switchably connecting selected ones of the feeds with related ones of the local and remote control sources; and including;
a feed regulator circuit to individually regulate a temporal frequency of each feed to the remote server.

23. The wireless transceiver apparatus of claim 17, further comprising:
an R/L evaluator circuit coupled to the R/L switch fabric to initiate switchable reconnection by the R/L switch fabric of a subset of the plurality of components coupled to a remote control source on the remote server to a local control source on the wireless transceiver, based on a failure of the remote control source.

24. The wireless transceiver apparatus of claim 17, further comprising:
the plurality of transmit and receive components configured as one of a Wireless Access Point (WAP) transceiver, a station transceiver, and a WiFi transceiver on a very large scale integrated circuit.

25. A method for operating a wireless transceiver configured to support wireless communications with associated transceiver nodes on at least one selected communication channel on a wireless local area network (WLAN); and the method comprising:
- providing a plurality of components coupled to one another to form transmit and receive paths for processing wireless communications on the at least one selected wireless communication channel;
- providing local controllers each of which controls a distinct portion of the wireless transceiver's wireless operations via connections to a related subset of the plurality of components;
- switchably connecting each of the subsets of the plurality of components to at least one of, a related one of the local controllers and a remote server providing remote control of a related portion of the wireless transceiver's wireless operations, to enable a configurable mix of local and remote control sources among the distinct portions of the wireless transceiver's wireless operations and further switchably connecting the one related subset of the plurality of components to both the related one of the local control circuits and to the remote server, responsive to a determination as to collaborative operational control of one distinct portion of the wireless transceiver's wireless operations provided by the related one of the local control circuits and by the remote server.

26. The method for operating the wireless transceiver of claim 25, further comprising:
- configuring the mix of local and remote control among the distinct portions of the wireless transceiver's wireless operations, responsive to a setup command from the remote server.

27. The method for operating the wireless transceiver of claim 25, further comprising:
- self-configuring the mix of local and remote control among the distinct portions of the wireless transceiver's wireless operations, responsive to a capabilities exchange with the remote server.

28. The method for operating the wireless transceiver of claim 25, further comprising:
- providing the plurality of components including feeds for monitoring associated wireless operational parameters; and
- switchably connecting selected ones of the feeds with the related ones of the local and remote control sources.

29. The method for operating the wireless transceiver of claim 25, further comprising:
- providing the plurality of components including sockets for controlling associated wireless operational parameters; and
- switchably connecting selected ones of the sockets with related ones of the local and remote control sources.

30. The method for operating the wireless transceiver of claim 25, further comprising:
- providing the plurality of components including feeds for monitoring associated wireless operational parameters;
- switchably connecting selected ones of the feeds with related ones of the local and remote control sources; and
- individually regulating a temporal frequency of each feed to the remote server.

31. The method for operating the wireless transceiver of claim 25, wherein the switchably connecting act further comprises:
- reconnecting a subset of the plurality of components coupled to a remote control source on the remote server to a local control source responsive to a failure of the remote control source.

32. The method for operating the wireless transceiver of claim 25, further comprising:
- operating the wireless transceiver as one of; a Wireless Access Point (WAP) transceiver, a station transceiver, and a WiFi transceiver on a very large scale integrated circuit.

* * * * *